United States Patent [19]

Aach et al.

[11] Patent Number: 5,708,693

[45] Date of Patent: Jan. 13, 1998

[54] IMAGE PROCESSING FOR NOISE REDUCTION

[75] Inventors: Til Aach; Dietmar W. Kunz; Stefan H. E. Lüdeke, all of Aachen, Germany

[73] Assignee: U.S. Philips Corporation, New York, N.Y.

[21] Appl. No.: 671,123

[22] Filed: Jun. 20, 1996

[30]   Foreign Application Priority Data

Jun. 23, 1995  [EP]  European Pat. Off. ............. 95201718

[51] Int. Cl.$^6$ ................................................. G01N 23/04
[52] U.S. Cl. ............................ 378/62; 382/130; 382/132
[58] Field of Search .............................. 378/62; 382/130, 382/131, 132

[56]   References Cited

U.S. PATENT DOCUMENTS

| | | | |
|---|---|---|---|
| 5,367,155 | 11/1994 | Colditz et al. | 250/214 |
| 5,417,215 | 5/1995 | Evans et al. | 128/660.06 |
| 5,461,655 | 10/1995 | Vuylsteke et al. | 378/62 |

FOREIGN PATENT DOCUMENTS 0574969  12/1993  European Pat. Off. .

OTHER PUBLICATIONS

"A New Case of Detail Preserving Filters for Image Processing", Ari Nieminen, Pekka Heinonen, Yrjo Neuvo, IEEE Transactions of Pattern Analysis and Machine Intelligence, vol. PAMI-9, No. 1, Jan. 1997.

"Order Statistics In Digital Image Processing", Joannis Pitas and Anastasios N. Venetsanopoulos, Proceedings of the IEEE, vol. 80, No. 12, Dec. 1992.

"A Generalization of Median Filtering Using Linear Combinations of Order Statistics", Alan C. Bovik, Thomas S. Huang, David C. Munson, Jr., IEEE Transactions on Acoustics, Speech and Signal Processing, Voo. ASSP-31, No. 6, Dec. 1983.

"Image Filtering Using Multiresolution Representations" S. Raganath, IEEE Transactions on Pattern Analysis and Machine Intelligence, vol. 13, No. 5, May 1991, pp. 426–440.

Primary Examiner—David P. Porta
Assistant Examiner—David Vernon Bruce
Attorney, Agent, or Firm—Jack D. Slobod

[57]   ABSTRACT

An image processing method includes multi-resolution decomposition to decompose an input image into frequency-band images, which are subsequently filtered according to an order statistics filtering. Preferably, a finite impulse response median hybrid is employed. The filtered frequency-band images are synthesized to form the filtered output image.

20 Claims, 4 Drawing Sheets

IMAGE PROCESSING FOR NOISE REDUCTION

BACKGROUND OF THE INVENTION

1. Field of the Invention

The invention relates to an image processing method including dividing an input image into several frequency-band images by means of a multi-resolution decomposition method, processing the separate frequency-band images to derive processed frequency-band images, the processing including filtering the frequency-band images to form filtered frequency-band images, and performing a multi-resolution synthesis method to the processed frequency-band images to form a filtered output image. The invention also relates to an image processor including a decomposition unit for dividing an input image signal into several frequency-band image signals, a converter unit for processing the frequency-band image signals, the converter unit including a filter for filtering the frequency-band image signals to form processed frequency-band image signal a synthesizer for forming an filtered output image signal from the processed frequency-band image signals.

2. Description of the Related Art

An image processing method and an image processor of this kind are known form the European patent application EP 0 574 969.

The known image processing method aims particularly at reducing noise in a medical radiographic image. Such a radiographic image is formed by irradiating a patient with x-rays. Owing to quantum noise of the x-radiation, noise occurs in the radiographic image, especially at low x-ray dose. The known image processing method includes a multi-level decomposition of the input image into a set of frequency-band images which represent the amount of detail in the input images at respective resolution levels. Each of the frequency-band images is a frequency band-pass filtered version of the input image. In this respect, also a high-pass filtered image and a low-pass filtered image are considered to be included in the set of frequency-band images. The cited reference mentions that the frequency band pass images are preferably down-sampled in order to reduce the computational effort required. Subsequently, filtering in the form of a noise compression is applied to separate frequency-band images and a contrast enhancement is applied so as to form processed frequency band images. Although the known method provides some advantages in that the use of multi-level decomposition achieves a substantial data compression and the noise compression is carried out rather effectively since the lower resolution frequency-band images contain much less noise, the known method, however, appears not to achieve satisfactory results when it is applied to a rather noisy input image in which small details are particularly relevant. The filtering in the known method appears to distort or smear edges and narrow lines in the image and produces patch-like artifacts. In particular, in medical diagnostic images such as an x-ray image or a magnetic resonance (MRI) image of a patient to be examined it is important to process the image such that noise is reduced and small details are preserved. For example, such small details may represent slight abnormalities in the anatomy of the patient. If such small details are made clearly observable in the filtered output image after processing then it provides a physician with information to reach a diagnosis in an early stage of the pathology.

SUMMARY OF THE INVENTION

An object of the invention is to provide an image processing method for noise reduction which also preserves small details in the image.

This object is achieved by an image processing method according to the invention which is characterized in that the filtering comprises an order statistics filtering.

The k-th order statistic of a set of pixel-values is defined as the k-th largest in algebraic value. Thus, of a number N of pixel-values the minimum is the first order statistic, the maximum is the N-th order statistic and the median is the ½(N+1)-th order statistic. The output value of an order statistics filter is a linear combination of one or several order statistics of the input pixel-values. Order statistics filtering as such is known from the articles 'A generalisation of median filtering using linear combinations of order statistics' by A. C. Bovik, T. S. Huang and D.C. Munson in IEEE ASSP-31 (1983)pp. 1342–1350 and 'Order statistics in digital image processing' by I. Pitas and A. N. Venetsanopoulos in Proceedings of the IEEE Vol.80 (1992)pp. 1893–1921. When such an order statistics filter is applied directly to the input image it appears that local peaks in the intensity distribution that are due to noise are converted in patch-like artificially looking features.

According to the invention, the order statistics filter is applied to the separate frequency-band images. These frequency-band images contain image information of the input image at separate frequency-bands, that is, separate frequency-band images contain details at separate scales in the input image. Preferably, the order statistics filter is applied to linear combinations of pixel-values of the frequency-band images. Because the frequency band images are not simple grey-value images with a non-negative grey-level range but the pixel-values of the frequency will have positive as well as negative values the order statistics filtering does hardly lead to the formation of patch-like artifacts. Even if there are patch-like artifacts formed, they will occur independently in different frequency band-pass images and they appear not to contribute in the filtered output image in an observable way by the synthesising step. The order statistics filter attenuates noise very effectively when the signal hardly changes and when a change in the signal occurs, noise attenuation is traded off to a good response to the change. Hence, the order statistics filtering preserves small details in the image such as edges and narrow lines, while reducing noise.

The image processing method according to the invention is especially advantageous for reducing noise in an x-ray image or in an image derived from an x-ray image. Thereby, an image having a good diagnostic quality is obtained while a low x-ray dose is applied to a patient to be examined.

The image processing method according to the invention is suitable for application to a single image frame. Hence, the image processing method of the invention does not introduce delays in that a few image frames would have to be formed before noise reduction is obtained. Also, the image processing method of the invention does not rely on temporal signal correlations between different frames. Therefore the image processing method according to the invention is in particular suitable to be combined with low rate pulsed fluoroscopy x-ray examinations. Also, the image processing method according to the invention is well-adapted for x-ray imaging which involves complex motion, like in cardiac imaging.

A preferred implementation of an image processing method according to the invention is characterized in that the order statistics filtering is a finite impulse response median hybrid filtering.

FMH (Finite impulse response Median Hybrid) filtering as such is known from the article 'A new class of detail

*preserving filters for image processing'* by A. Nieminen, P. Heinonen and Y. Neuvo in IEEE PAMI-9 (1987)pp74-90. The FMH-filtering retains details in the image irrespective of their orientation. FMH-filtering applies an order statistics filtering to linear combinations, such as an average, of sets comprising a finite number of pixel-values. Because FMH-filtering makes use of finite impulse response, the number of data processing operations remains limited to a small constant number and in addition only requires simple averaging operations and the simple computation of medians. Hence, FMH-filtering is computationally much more efficient as compared to median filtering as such.

A further preferred implementation of an image processing method according to the invention is characterized in that the processing comprises computation of differences, for corresponding pixels, between pixel-values of a filtered frequency-band image and pixel-values of a corresponding frequency-band image comparing said differences with a threshold value and deriving a processed frequency-band image from pixel-values of said filtered frequency-band image for which pixel-values said difference has a magnitude less than the threshold value and from pixel-values of said frequency-band image for which pixel-values said magnitude of said difference is greater than the threshold value.

Pixel-values of frequency-band image are compared to pixel-values of filtered frequency-band image, said respective pixel-values pertaining to substantially the same image information. According to this implementation noise is only removed provided that the difference between a filtered pixel-value and the pixel-value in the input image remains below the threshold. Therefore, isolated local signal maxima that pertain to small details in the image are preserved while noise peaks are mostly removed.

A further preferred implementation of the image processing method according to the invention is characterized in that the threshold value is derived from the input image.

Often the noise level, that is the standard deviation of the pixel-value due to noise, is dependent on the signal level. In particular, when the noise has a substantial Poissonian nature, as is the case when shot noise such as x-ray quantum noise is the major origin of noise, the noise level is proportional to the signal level. In the present implementation, the expected noise level is estimated from pixel-values in the input image. An accurate adjustment of the threshold is derived from the input image such that almost all noise peaks are removed by the filtering whereas almost all local signal maxima that relate to image information are preserved.

A further preferred implementation of an image processing method according to the invention is characterized in that the threshold value is derived from a low-frequency frequency-band image.

The pixel-values in said low-frequency frequency-band image provide an accurate estimate for the average pixel-value in the input image. Therefore, an accurate value for the threshold is preferably derived from the low-frequency frequency-band image in case the noise level depends substantially only on the average pixel-value in the input image.

A further preferred implementation of an image processing method according to the invention is characterized in that the threshold value is adjustable.

The adjustable threshold provides a possibility to adapt the filtered output image to the perception of the human observer.

A further preferred implementation of an image processing method according to the invention wherein the input image is derived from an x-ray image that is formed by irradiating an object with x-rays, is characterized in that the threshold value is derived from the x-ray dose.

X-ray examination is carried out in that a patient to be examined is irradiated by x-rays and an x-ray image is formed as a shadow image on an x-ray detector. The x-ray detector converts the x-ray image into an electronic image signal which represents the brightness distribution in the x-ray image. For example, an x-ray image intensifier television chain or an x-ray detector having a plurality of x-ray sensitive elements which are preferably arranged as a matrix may be employed. Notably, when the x-ray detector is an x-ray image intensifier television chain, the x-ray image is formed on the entrance screen of the x-ray image intensifier and convened into a light-optical image on the exit window. The light-optical image is picked-up by a camera, notably comprising a ccd-image sensor, which forms an electronic image which is outputted as an electronic image signal. The signal levels of the electronic image signal are representative of the brightness values in the light-optical image.

Especially when x-ray examination is performed in a fluoroscopy mode, i.e. the patient is continuously irradiated and a sequence of images is produced, the x-ray intensity should remain low so as to limit the x-ray dose received by the patient. At low x-ray intensity the x-ray image contains a relatively strong noise component which is caused by x-ray quantum shot noise. Quantum noise in fluoroscopy is filtered by the image system's transfer function and correspondingly the noise component of the electronic image signal has a low-pass power spectrum. In particular, any strong noise peaks in the x-ray image are passed on to the light-optical image and the electronic image that are derived from the x-ray image and smoothed over by the image system transfer function. According to the invention the image processing method is advantageously performed with the x-ray image or an image derived from it, such as the light-optical image as the input image. This can be carried out by supplying the electronic image signal as the input image signal to an image processor according to the invention. Good noise reduction is achieved according to the invention as lower frequency band-pass images are separately filtered. The image processing method according to the invention is preferably applied to an x-ray image, or an image derived from the x-ray image such as the electronic image, to provide a filtered output image which is suitable for use by a radiologist for medical diagnostic purposes. In particular for medical diagnostic purposes as well as for imaging to provide visual guidance for a therapeutical or interventional procedure it is advantageous to remove noise, while preserving small details in the image. Especially when a low x-ray dose is employed noise problems occur because x-ray quantum noise is increasingly dominant as the x-ray dose is decreased.

The noise contribution is approximately proportional to the average brightness in the x-ray image as the x-ray quantum noise has a Poissonian nature. Hence, preferably an image processing method as defined in Claim 5 is employed for reducing noise and preserving image details in an x-ray image or in an image derived form an x-ray image.

A further preferred implementation of an image processing method according to the invention is characterized in that the input image comprises sub-images, image lines of separate sub-images forming alternating image lines of the input image and that the filtering is performed along directions not parallel to the image lines of the input image.

This implementation of the image processing method according to the invention is advantageously employed to an interlaced input image, such an image comprises sub-images originating from an image pick-up device operating in an interlaced mode. The pixel-values of the input image have a correlation that corresponds to the image information in the input image within an image line and between image lines of the same sub-image, but there is a much lower correlation between pixel-values in the input image but of different sub-images. Separate sub-images are output successively by the image pick-up device. For example in a 2:1 interlaced mode the image pick-up device first records a sub-image having the odd-image lines of the image that is supplied as the input image to the image processing and subsequently, with a short time delay, the image pick-up device records a next sub-image having the even image lines of the input image. As a consequence, in a 2:1 interlaced input image there is a high correlation of pixel-values within an image line and between every other line, while the correlation between pixel-values of adjacent lines is much lower. According to the present preferred implementation filtering along image lines is excluded. As a consequence, differences between pixel-values of adjacent image lines are not unjustly considered as (part of) signals and substantial noise reduction is achieved for interlaced images. Moreover, this implementation renders the image processing method substantially insensitive to disturbances, e.g. the occurrence of stripe-like features, due to noise that is present in one sub-image, but absent in other sub-images.

The image processing method according to the invention is further suitable to be combined with image enhancement methods such as edge sharpening and contrast enhancement. Edge sharpening to improve visibility of step-like variations in the pixel-values can be achieved by amplifying higher frequency band-pass images by a constant or a contrast and/or brightness dependent amplification ratio. That is, the amplification ratio may be adjusted as a function of the average pixel-value of the image and/or as a function of gradients of pixel-values in the image. Low-frequency contrast compression to improve the visibility of small details is possible by attenuation of the lower frequency-band pass image(s). Especially in x-ray fluoroscopy image quality is substantially improved in that approximately a perceived image quality of a comparatively high-dose x-ray exposure image is obtained. Further, the image processing method of the invention is suitable for application in subtraction angiography.

Another object of the invention is to provide an image processor for noise reduction which also preserves small details in the image. This object is achieved by the image processor according to the invention which is suitable for performing the image processing method as previously discussed. That is, the image processor according to the invention is characterized in that the filter comprises an order statistics filter.

A preferred embodiment of the image processor according to the invention includes an arithmetic unit, a comparator and a selection unit is defined in Claim 8 which is suitable for carrying-out the image processing method of Claim 3.

It is noted that the functions of an image processor according to the invention may be carried out by a suitably programmed computer. Alternatively, the image processor may be equipped with a special purpose microprocessor that is designed for carrying out the functions of the image processor. Further it is noted that the image processing method according to the invention may be advantageously employed to noisy images that are generated by x-ray imaging, including computed tomography, but also to noisy images generated by magnetic resonance imaging, ultra sound or electron microscopy.

These and other aspects of the invention will be apparent from and are elucidated with reference with respect to the embodiments described hereinafter and with reference to the accompanying drawing.

DESCRIPTION OF THE DRAWING

The accompanying drawing includes the following figures wherein.

DESCRIPTION OF THE PREFERRED EMBODIMENTS

Figure 1:
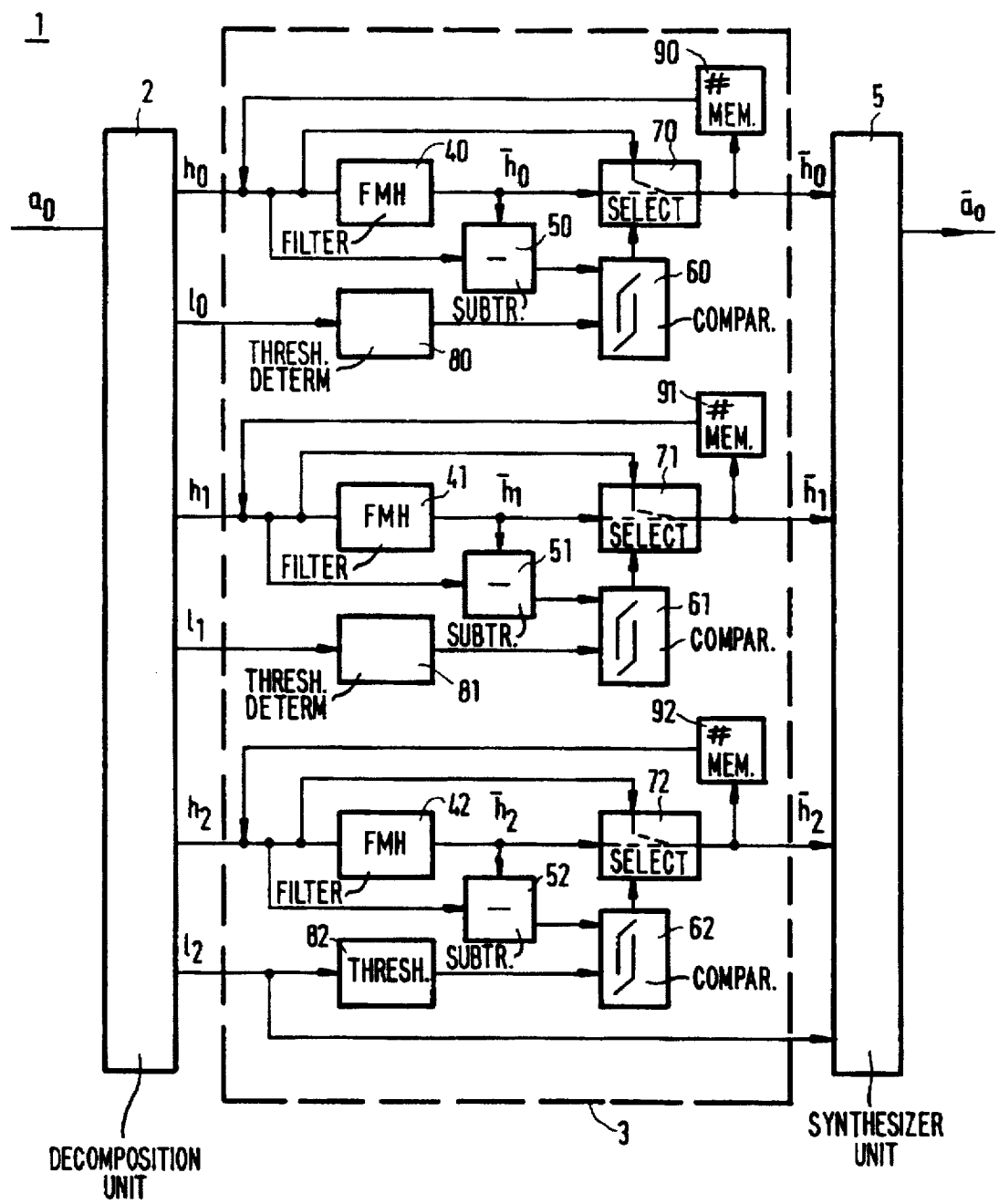
FIG. 1 is diagrammatic representation of an image processor according to the invention.

FIG. 1 is a diagrammatic representation of an image processor according to the invention. An input image signal $a_0$ is supplied to the decomposition unit 2 which generates a plurality of frequency-band images at several resolution levels. At separate resolution levels frequency-band image containing image information of the input image at separate frequency-bands is formed, i.e. the frequency-band images contain image details at different scales. The signal levels, i.e. the signal amplitudes of the input image signal $a_0$ represent pixel-values of the input image. The operation of the decomposition unit 2 is further elaborated on with reference to FIG. 2 hereinafter. The decomposition unit 2 is coupled with its output to the converter unit 3 which applies processed frequency-band image signals to the synthesizer unit 5. The filtered output image signal is composed by the synthesizer unit from the processed frequency-band signals. In the example there are only three resolution levels shown, but in practical situations many resolution levels may be employed. For example for processing an input image having 1 $k^2$ (i.e. 1024×1024) pixels five or six resolution levels may be employed. Since a subsampling, which involves discarding some of the pixel-values, is performed the number of pixel-values involved is decreased and hence the introduction of additional resolutions levels does not substantially increase the computational load. At each resolution level a high-pass frequency-band signal and a low-pass frequency-band image signal are formed. At the k-th resolution level a high-pass $h_k$ and a low-pass $l_k$ image signal are formed.

The high-pass image signal at the 0th resolution level $h_0$ is applied to the FMH-filter 40 which supplies a filtered high-pass signal $\bar{h}_0$ to the comparator 70. The arithmetic unit incorporates a subtracter 50 which computes the difference $(h_0 - \bar{h}_0)$ between the signals $h_0$ and $\bar{h}_0$. The comparator 60 is arranged to compare the magnitude of the difference signal with a threshold value. A threshold determinator 80 derives the value of the threshold from a low-pass frequency band signal $l_0$ at the 0th resolution level, so that the threshold value employed in the comparator 60 is made dependent on the input image signal $a_0$. Provided the magnitude of the difference signal does not exceed the current threshold, the signal $\bar{h}_0$ is selected by the selection unit 70 the signal $\bar{h}_0$ is employed as the processed frequency-band image signal $h^\sim_0$. When the magnitude of the difference signal level exceeds the threshold then the signal $h_0$ is employed as the processed frequency band image signal. If there is a large difference between the filtered high-pass frequency band image signal, i.e. exceeding the threshold, this mostly indicates a relevant detail in the input image. The operation of the image processor achieves that in such a case the high-pass frequency band signal is retained so that the pixel-values relating to a local detail in the image are included in the filtered output image signal.

Similarly as described above for the 0th resolution level the image processor is arranged to derive processed frequency-band image signals $h^\sim_k$ from frequency band signals $h_k$ (k=1,2,...). FMH-filters 41,42 form filtered frequency-band image signals $\bar{h}_k$. The difference between signals $\bar{h}_k$ and $h_k$ are computed in subtracters 51,52 and compared to threshold-values by means of comparators 61,62. The threshold-values for respective resolution levels are derived from the low-frequency frequency-band image signals by means of threshold determinators 81,82. The image processor is provided with comparators 61,62 to drive selection units 71,72 to select signals $\bar{h}_k$ or $h_k$ depending on whether or not the magnitude of the difference $|\bar{h}_k - h_k|$ exceeds the threshold, so as to form the processed frequency-band image signals at the respective resolution levels.

As an option, processing of the processed frequency-band image signals $h^\sim_k$ from the frequency-band signals image $\bar{h}_k$ is reiterated to achieve further noise reduction, while preserving details in the image the. In practice it appears that favorable results are obtained by reiterating just once. To that end, the processed frequency-band image signals $h^\sim_k$ are fed via respective memory units 90,91 and 92 to the inputs of the respective FMH-filters 40,41 and 42. The reiteration may be performed recursively, in that the processed frequency-band image signals $h^\sim_k$ are supplied pixel-by-pixel via the respective memory units 90,91,92. Alternatively, the re-iteration may be performed frame-by-frame, in that pixel-values of processed frequency-band image signals $h^\sim_k$ relating to complete image frames are stored in the respective memory-units 90,91,92 and subsequently supplied to the respective FMH-filters 40,41,42.

Figure 2:
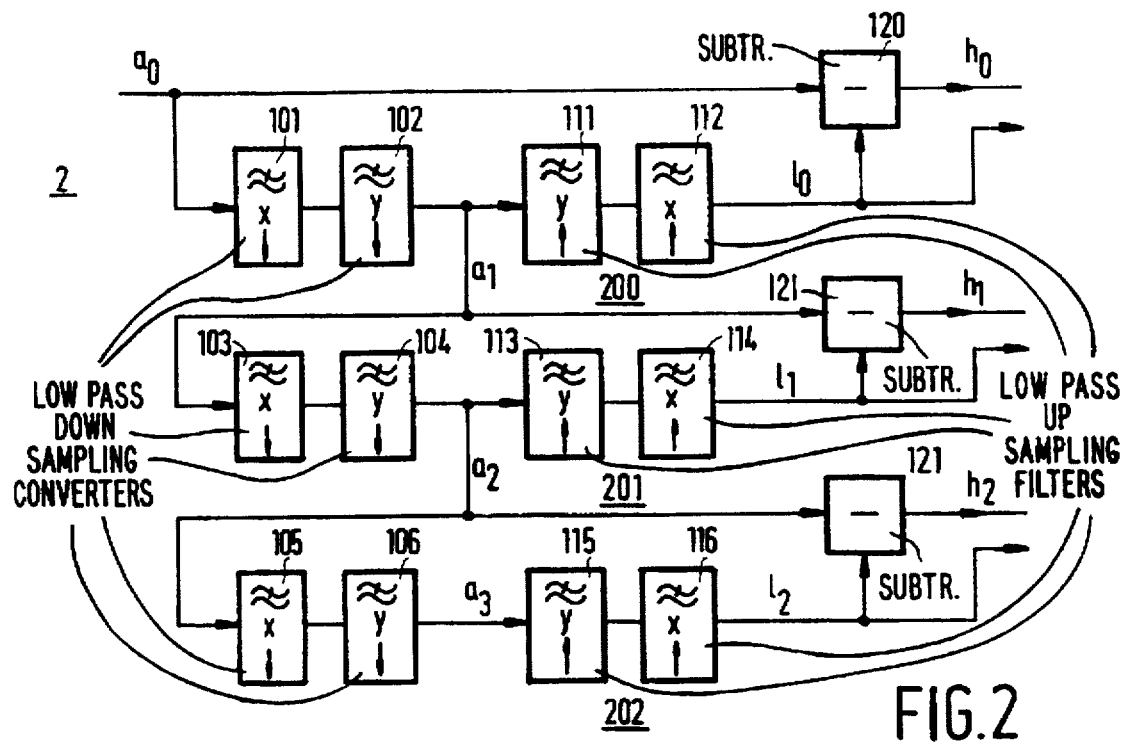
FIG. 2 is a diagrammatic representation of a decomposition unit of the image processor of FIG. 1

FIG. 2 is a diagrammatic representation of the decomposition unit 2 of the image processor of FIG. 1. The image signal $a_0$ is supplied to low-pass down-sampling filters 101 and 102 which perform low-pass filtering in two directions in the image (denoted as x and y) and a down-sampling, for example by a factor of 2). Down-sampling is simply performed by omitting every second pixel-value. The low-pass down-sampled signal $a_1$ is supplied to an interpolator 200. The interpolator 200 here is formed as a pair of low-pass up-sampling filters 111,112 which also perform an up-sampling in both x and y directions. The operation as an interpolator of the low-pass up-sampling filters 111,112 is to insert zeros between successive pixel-values in the signal $a_1$ and to perform a smoothing. The low-pass up-sampling filters 101,102 and low-pass down-sampling filters 111,112 may have the same or different cut-off frequencies. The interpolator 200 derives a low-pass frequency band image signal $l_0$, which is subtracted by subtracter 120 form the input image signal $a_0$ so as to form the high-pass frequency-band image signal $h_0$. The signals $a_1$ and $l_0$ include image information having variations on at least a spatial scale that corresponds to the cut-off frequency of the low-pass down-sampling filters 101 and 102.

The signal $a_1$ is subsequently passed to a pair of low-pass down-sampling filters 103 and 104 to form a signal $a_2$. A low-pass frequency band image signal $l_1$ is derived from the signal $a_2$ by means of an interpolator 201 which comprises a pair of low-pass up-sampling filters 113, 114. The signals $a_2$ and $l_1$ include image information having variations on at least a spatial scale that corresponds to the cut-off frequency of the low-pass down-sampling filters 103 and 104. By means of subtracter 121 the high-pass frequency band image signal $h_1$ for the 1st resolution level is derived from the signals $a_1$ and $l_1$, viz. $h_1 = a_1 - l_1$.

The signal $a_2$ is subsequently passed to a pair of low-pass down-sampling filters 105 and 106 to form a signal $a_3$. A low-pass frequency band image signal $l_2$ is derived from the signal $a_3$ by means of an interpolator 202 which comprises a pair of low-pass up-sampling filters 115,116. By means of subtracter 122 the high-pass frequency band image signal $h_2$ for the 1st resolution level is derived from the signals $a_2$ and $l_2$. The signals $a_3$ and $l_2$ include image information having variations on at least a spatial scale that corresponds to the cut-off frequency of the low-pass down-sampling filters 105 and 106.

It will be apparent for the skilled person that the decomposition into frequency-band image signals for successive resolution levels can be continued beyond the three levels shown in the embodiment of FIG. 2.

Figure 3:
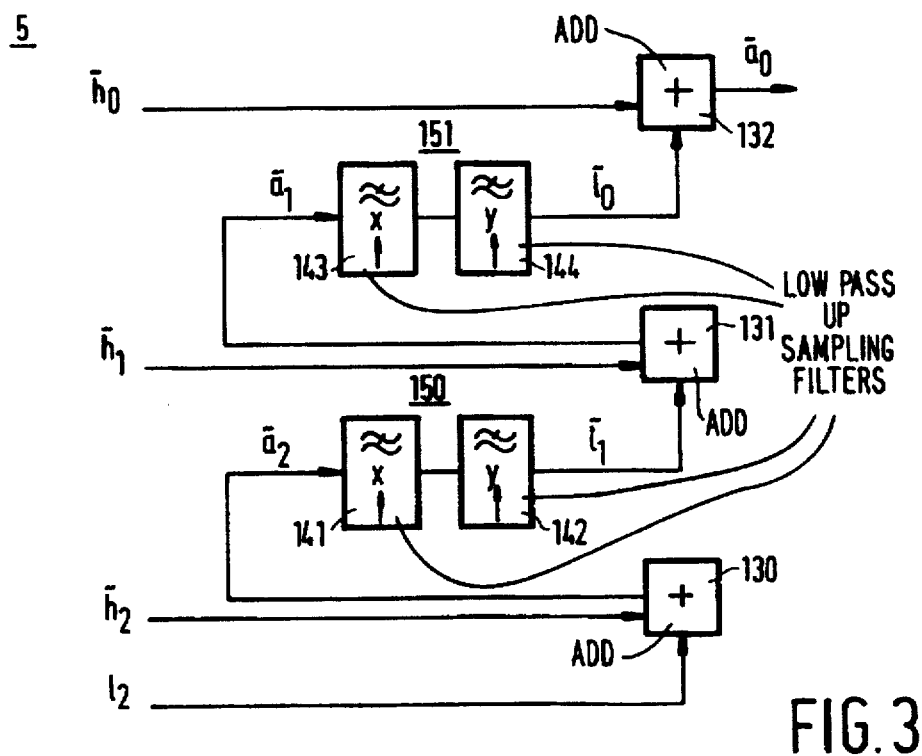
FIG. 3 is a diagrammatic representation of a synthesizer of the image processor of FIG. 1.

FIG. 3 is a diagrammatic representation of the synthesizer 5 of the image processor of FIG. 1. The synthesizer 5 comprises an adder 130 arranged to add the low-pass frequency-band image signal $l_2$ of the lowest (in this case the 2nd) resolution level to the processed high-pass frequency-band image signal $h^\sim_2$, so as to form a signal $a^\sim_2$. An interpolator 150 formed by low-pass up-sampling filters 141,142, derives a low-pass processed frequency-band image signal $l^\sim_1$ of the 1st resolution level. Another adder 131 adds the processed high-pass frequency-band image signal of the 1st resolution level $h^\sim_1$ to the signal $l^\sim_1$ so as to form a signal $a^\sim_1$. A low-pass processed frequency-band image signal of the 0th resolution level $l^\sim_0$ is derived by a further interpolator 151 from the signal $a^\sim_1$. Finally, the filtered output image signal $a^\sim_0$ of the 0th resolution level is formed by still another adder 132 which adds the signals $l^\sim_0$ and $h^\sim_0$. The signal levels, viz. the signal amplitudes of the filtered output image signal $a^\sim_0$ represent pixel-values of the filtered output image. The interpolator 151 comprises two low-pass up-sampling filters 143,144. The interpolators 150 and 15 1 operate in the same manner as the interpolators 200, 201 of the decomposition unit 2. It is noted that the frequency characteristics of the low-pass up-sampling filters of the interpolators 150,151 should be accurately matched at separate resolution levels to the low-pass up-sampling filters 111 to 116 of the respective corresponding resolution levels. The accurate matching is required so as to avoid loss of image information in the combined decomposition-synthesisation process.

Figure 4:
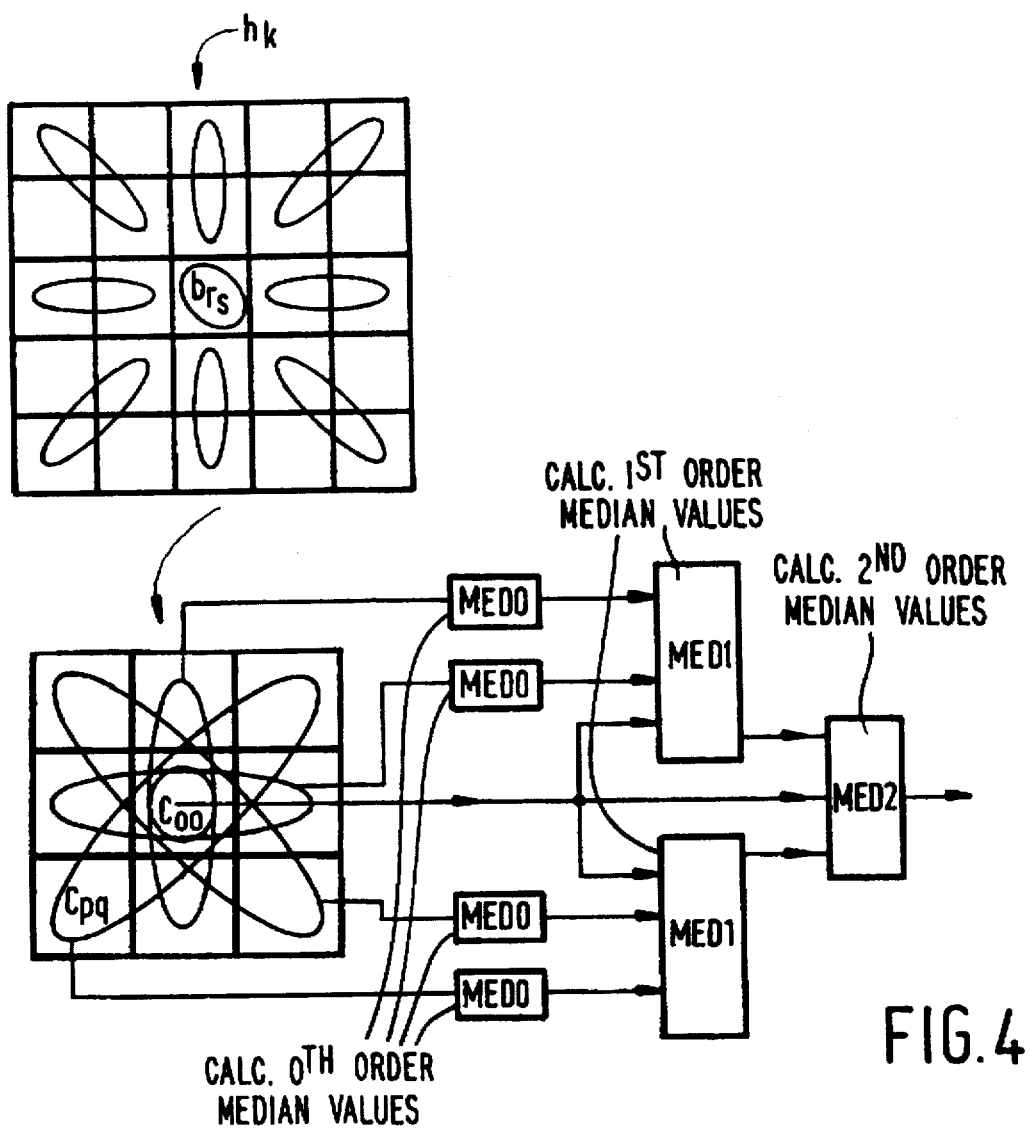
FIG. 4 is a schematic representation of the filtering performed in the conversion unit of an image processor according to the invention.

FIG. 4 is a schematic representation of the filtering performed in the conversion unit of an image processor according to the invention. By way of example the filtering of the high-pass frequency-band image of the k-th resolution level is discussed. The signal $h_k$ contains pixel-values $b_{rs}$. For each point (r,s) in the image a 3×3 matrix with matrix-elements $c_{pq}$, is computed where $c_{pq}=1/n\Sigma_{t=1}{}^n b_{r+p,s+q}, p,q \in \{-1,0,1\}$ Of course $c_{00}$ is the pixel-value $b_{rs}$. Subsequently median values of 0th order triplets of $c_{pq}$ are calculated (indicated by the boxes denoted MED0), the triplets extending in all four directions around $c_{00}$ in the matrix. Then the median values of the horizontal and vertical directions are combined with the central value $c_{00}$ to form a 1st order triplet. Another 1st order triplet is formed from both triplets relating to the diagonal directions in the matrix together with the central value $c_{00}$. The boxes denoted MED1 indicate the calculation of the 1st order median values. A 2nd order triplet is finally formed (in the box MED2) from the median values of the 1st order triplets together with the central value $c_{00}$. The median value of the 2nd order triplet is finally employed as the pixel-value $d_{rs}$ of the position (r,s) in the filtered high-pass frequency band image $\bar{h}_k$. The computation shown here amounts to a cascade of simple medians. The cascade median filtering replace the grey value $c_{00}$ in the center if it is an extremum in each of the four directions rested by the median filtering. If in any direction this is not the case, for instance when the center grey level is part of a brightness ramp with the adjacent averages from that direction, the center grey level is considered to be a signal and preserved. The cascade median filtering shown in the example only requires eight simple averaging operations which may be performed each as the sum of two pixel-values followed by a bit shift and seven times computing a median value. It is noted that the filtering includes computations involving only a finite number, here three, of pixel-values $b_{rs}$ of the high-pass frequency band image, this feature represents the finite impulse response nature of the filtering. In case the cascade medium filtering outputs the central value $C_{00}$ is appears to be advantageous to replace that output by the average of the central value and values of sunwinding matrix elements $C_{pq}$ that differ at most predetermined value from the central value. In this way a further reduction of noise is achieved. Further, contrast is enhanced by forming said average latering into account only sunwinding matrix elements having a large value than the central value in case the central value exceeds a preset boundary value.

In case of interlaced images, the processing of the high-pass frequency-band image is preferably modified in that $c_{0,-1}$ and $c_{01}$ are not evaluated and the first order median is only evaluated for the vertical and the two diagonal directions, i.e. for the directions not parallel to the image lines. Subsequently, the result of the 0th order median MED0 for the vertical direction is directly fed onto the 2nd order median filter MED2.

Figure 5:
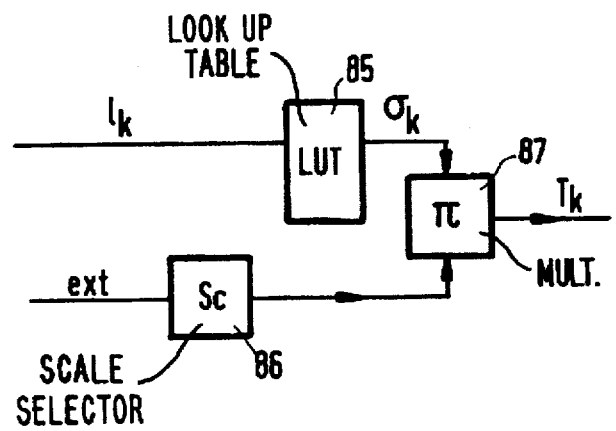
FIG. 5 is a diagrammatic representation of an embodiment of a threshold determinator of an image processor according to the invention.

FIG. 5 is a diagrammatic representation of an embodiment of one of the threshold determinators 80,81,82 of the image processor according to the invention. Each threshold determinator comprises a look-up table (LUT) 85 in which expected standard deviations as a function of the signal level of the input image are stored, for the resolution level at issue. The expected standard deviation are stored e.g. in a tabular form. The low-pass frequency-band image signal $l_k$ of the resolution level at issue is supplied to the look-up table 85. Associated with the signal amplitude of the signal $l_k$ an expected standard deviation level $\sigma_k$ for the k-th resolution level is supplied by the look-up table 85. Optionally the expected standard deviation may also be multiplied by an external scale factor to account for external influences on the noise level. For instance, an x-ray dose employed to generate the input image signal is a parameter on which the noise level is dependent. A scale selector 86 is provided which outputs an appropriate scale-factor Sc in dependence of an external signal. The multiplicator 87 supplies the threshold-value $T_k$ for the resolution level at issue. So as to take into account the effect of the decomposition into the resolution level at issue on the noise level, separate look-up tables are provided at each resolution level.

Figure 6:
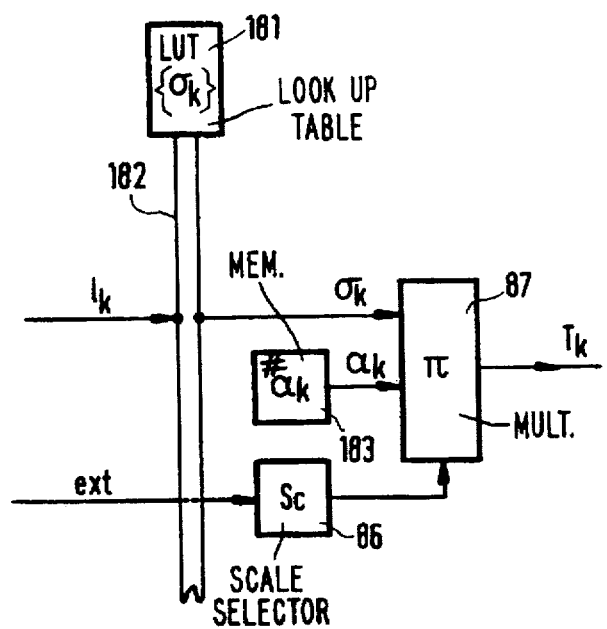
FIG. 6 is a diagrammatic representation of a further embodiment of a threshold determinator of an image processor according to the invention and, FIG. 7 is a schematic representation of an x-ray examination apparatus equipped with an image processor according to the invention.

FIG. 6 is a diagrammatic representation of a further embodiment of a threshold determinator of an image processor according to the invention. In the embodiment shown in FIG. 6 a common look-up table 181 is provided containing expected standard deviations $\sigma_k$ in dependence of pixel-values of the signal $l_k$. The look-up table is arranged to communicate with the respective threshold determinators via a bus 182. The expected standard deviation pertaining to the average grey level is supplied to the multiplier 87. The multiplier 87 multiplies the expected standard deviation level $\sigma_k$ by the appropriate scale factor so as to take into account the effect of the resolution level at issue on the noise level. A scale factor value $\alpha_k$ associated with the respective resolution level is stored in a memory unit 183. Optionally the expected standard deviation may also be multiplied by an external scale factor to account for external influences on the noise level in the same way as explained with respect to FIG. 5. The threshold-value $T_k$ for the k-th resolution level is supplied at the output of the multiplicator 87.

Figure 7:
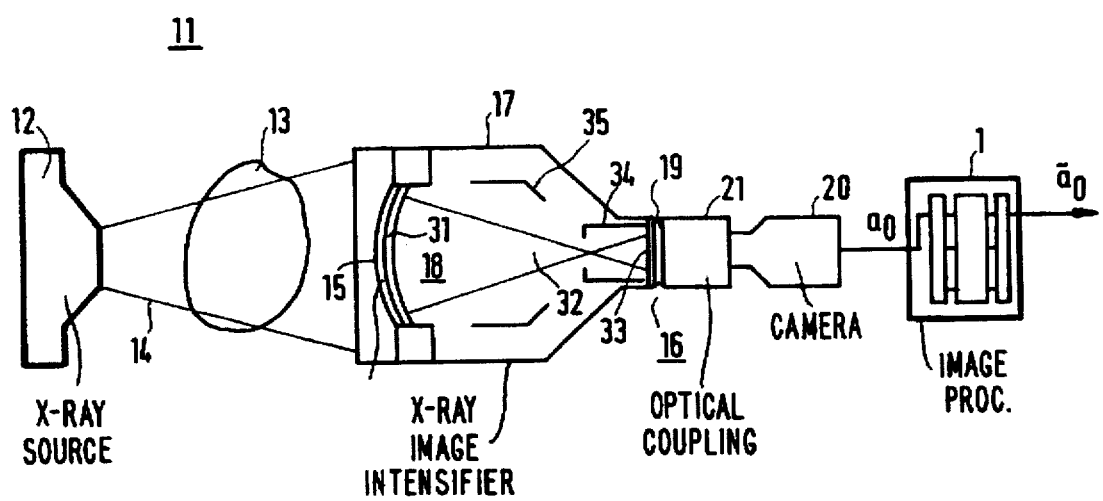

FIG. 7 is a schematic representation of an x-ray examination apparatus provided with an image processor according to the invention. The x-ray examination apparatus 11 comprises an x-ray source 12 for irradiating an object 13, for example a patient who is to be radiologically examined, with an x-ray beam 14. Because of local variations of the x-ray absorption in the patient an x-ray shadow image is formed on an x-ray sensitive face 15 of an x-ray detector 16. An electronic image signal is derived from the x-ray image by the x-ray detector. In particular the x-ray detector comprises an x-ray image intensifier 17 having an entrance section 18 which incorporates the x-ray sensitive face 15. The x-radiation incident on the entrance section 18 is converted in an image carrying electron beam which generates a light-optical image on the exit window 19. The entrance section includes the x-ray sensitive face, having the form of a scintillator screen 30, and a photocathode 31. The incident x-rays are converted in the scintillator screen into e.g. blue or ultraviolet light for which the photocathode 31 is sensitive. The electron beam 32 generated by the photocathode 31 is imaged by an electron-optical system 32 onto a phosphor screen 33 that is disposed on the exit window 19. The electron optical system includes the photocathode 31, a hollow anode 34 and a number of electrodes 35. A camera 20 is arranged to pick-up the light-optical image; to that end an optical coupling 21, e.g. a lens system, is provided to optically couple the camera 21 to the exit window 19. The electronic image signal at the output of the camera is supplied as the input image signal $a_0$ to the image processor 1 according to the invention. The output signal $a^-_0$ represents a filtered output image in which noise is substantially reduced while small details are preserved. In practice a noise reduction of 4–5 dB appears to be achieved. Therefore, the faltered output image has a high diagnostic quality even when a low x-ray dose is employed.

What is claimed is:

1. An image processing steps comprising the steps of:
   dividing an input image into several frequency-band images by means of a multi-resolution decomposition method,
   processing the separate frequency-band images to derive processed frequency-band images, the processing comprising filtering the frequency-band images to form filtered frequency-band images, and
   performing a multi-resolution synthesis method to said processed frequency-band images to form a filtered output image, characterized in that the filtering comprises an order statistics filtering.

2. An image processing method as claimed in claim 1, characterized in that the input image comprises sub-images, image lines of separate sub-images forming alternating image lines of the input image and that the filtering is performed along directions not parallel to the image lines of the input image.

3. An image processing method as claimed in claim 1, characterized in that the order statistics filtering is a finite impulse response median hybrid filtering.

4. An image processing method as claimed in claim 3, characterized in that the input image comprises sub-images, image lines of separate sub-images forming alternating image lines of the input image and that the filtering is performed along directions not parallel to the image lines of the input image.

5. An image processing method as claimed in claim 3, characterized in that the processing comprises:

computing differences, for corresponding pixels, between pixel-values of a filtered frequency-band image and pixel-values of a corresponding frequency-band image, comparing said differences with a threshold value and, deriving a processed frequency-band image from pixel-values of said filtered frequency-band image for which pixel-values said difference has a magnitude less than the threshold value and from pixel-values of said frequency-band image for which pixel-values said magnitude of said difference is greater than the threshold value.

6. An image processing method as claimed in claim 5, characterized in that the input image comprises sub-images, image lines of separate sub-images forming alternating image lines of the input image and that the filtering is performed along directions not parallel to the image lines of the input image.

7. An image processing method as claimed in claim 5, characterized in that the threshold value is adjustable.

8. An image processing method as claimed in claim 7, characterized in that the input image comprises sub-images, image lines of separate sub-images forming alternating image lines of the input image and that the filtering is performed along directions not parallel to the image lines of the input image.

9. An image processing method as claimed in claim 7, wherein the input image is derived from an x-ray image that is formed by irradiating an object with x-rays, characterized in that the threshold value is derived from the x-ray dose.

10. An image processing method as claimed in claim 9, characterized in that the input image comprises sub-images, image lines of separate sub-images forming alternating image lines of the input image and that the filtering is performed along directions not parallel to the image lines of the input image.

11. An image processing method as claimed in claim 1, characterized in that the processing comprises:

computing differences, for corresponding pixels, between pixel-values of a filtered frequency-band image and pixel-values of a corresponding frequency-band image, comparing said differences with a threshold value and, deriving a processed frequency-band image from pixel-values of said filtered frequency-band image for which pixel-values said difference has a magnitude less than the threshold value and from pixel-values of said frequency-band image for which pixel-values said magnitude of said difference is greater than the threshold value.

12. An image processing method as claimed in claims 11, characterized in that the input image comprises sub-images, image lines of separate sub-images forming alternating image lines of the input image and that the filtering is performed along directions not parallel to the image lines of the input image.

13. An image processing method as claimed in claim 11, characterized in that the threshold value is adjustable.

14. An image processing method as claimed in claim 13, characterized in that the input image comprises sub-images, image lines of separate sub-images forming alternating image lines of the input image and that the filtering is performed along directions not parallel to the image lines of the input image.

15. An image processing method as claimed in claim 13, wherein the input image is derived from an x-ray image that is formed by irradiating an object with x-rays, characterized in that the threshold value is derived from the x-ray dose.

16. An image processing method as claimed in claim 15, characterized in that the input image comprises sub-images, image lines of separate sub-images forming alternating image lines of the input image and that the filtering is performed along directions not parallel to the image lines of the input image.

17. An image processor comprising:

a decomposition unit for dividing an input image signal into several frequency-band image signals, a converter unit for processing the frequency-band image signals, the converter unit comprising a filter for filtering said frequency-band image signals to form processed frequency-band image signals, and a synthesizer for forming an filtered output image signal from said processed frequency-band image signals, characterized in that the filter comprises an order statistics filter.

18. An image processor as claimed in claim 17, characterized in that the converter unit comprises:

an arithmetic unit arranged to receive pixel-values of the frequency-band image signals and pixel-values of the corresponding filtered frequency-band image signals and compute differences between said pixel-values of the frequency-band image signals and said pixel-values of the corresponding filtered frequency-band image signals, a comparator to compare said differences with a threshold-value, and a selection unit for selecting pixel-values of the filtered frequency band image signals difference having a magnitude less that the threshold and forming a processed frequency band image form selected pixel-values.

19. An x-ray examination apparatus comprising:

an x-ray source for irradiating an object with an x-ray beam to form an x-ray image, an x-ray detector facing the x-ray detector for providing at its output an electronic image signal from the x-ray image, characterized in that the x-ray examination apparatus is provided with an image processor as claimed in claim 18 and having its input coupled to the output of the x-ray detector.

20. An x-ray examination apparatus comprising:

an x-ray source for irradiating an object with an x-ray beam to form an x-ray image, an x-ray detector facing the x-ray detector for providing at its output an electronic image signal from the x-ray image, characterized in that the x-ray examination apparatus is provided with an image processor as claimed in claim 18 and having its input coupled to the output of the x-ray detector.

* * * * *